3,143,472
ENTERIC COMPOSITIONS
Lewis C. Lappas and Charles W. McKeehan, Indianapolis, Ind., assignors to Eli Lilly and Company, Indianapolis, Ind., a corporation of Indiana
No Drawing. Filed Sept. 25, 1961, Ser. No. 140,201
11 Claims. (Cl. 167—82)

This invention relates to novel enteric compositions and, more particularly, to enteric medicaments which simply and economically can be designed in a "tailor-made" fashion for specific therapeutic applications.

Many medicaments are best administered to humans and animals in a form which protects the medicament from undesirable disintegration in the stomach, but releases the drug in a desired portion of the intestinal tract where investigation has shown that effective absorption of the particular drug occurs. The preparation of a drug in such a form is an extremely difficult problem in the design of medicaments. The point is best illustrated by a specific example.

A pharmaceutical need, demanding an effective enteric material, exists in the treatment of parasitic infections. It is well known that certain helminths are parasitic and infect the gastro-intestinal tract of man and other animals. Such parasitic infection, or helminthiasis, is said to be the most prevalent disease in the world. In its treatment, it would be extremely beneficial to have a medicament designed to release in the area of the gastro-intestinal tract inhabited by the undesirable parasites. For example, the highly objectionable Strongyloides worms, which produce anemia, malnutrition, and ultimately death, reside in the area of the duodenum immediately adjacent to the pyloric valve. Extremely sensitive enterics are needed to effectively treat this infection, since release of the medicament should occur immediately after it leaves the stomach and enters the duodenum. If the medicament passes on further down the intestinal tract—that is, if it is not released within the area of parasitic habitation—the parasites will not be effectively destroyed. If release occurs in the stomach, serious gastric disturbances could occur due to the general sensitivity of the gastric mucosa to commercial anthelmintics. As enteric medicament, "tailor-made" for specific treatment of Strongyloides infections, would be most desirable, but, unfortunately, such preparations are not available.

Besides the need for specificity, the design of medicaments is complicated by the often-encountered need for a controlled release of drug (i.e., a uniform application thereof to specific areas) as the medicament travels through the digestive system. Controlled release may be highly important in minimizing toxic effects of a drug and maintaining prolonged therapeutic levels necessary for effective treatment. In some cases, controlled release most advantageously may occur entirely in the intestinal tract or, in others, may be initiated in the stomach and continued in the intestinal tract. The first case calls for an enteric medicament wherein the drug is fully protected from release in the stomach by an enteric material. The second case requires a sustained-release preparation wherein the drug not only is protected from disintegration in the stomach by an enteric material, but also is present in a form which will allow a portion of the drug to be released in the stomach.

In spite of these problems, the pharmaceutical art is conspicuously devoid of enteric materials which can be "tailor-made" to the solution of a particular medicament design problem. The provision of such enteric materials would be an outstanding contribution to therapeutics.

It is a primary object of this invention to provide such "tailor-made" enteric materials in a simple and economical fashion. The enterics of this invention remain intact in the stomach, but can be specifically designed to disintegrate rapidly at a predetermined point in the intestinal tract.

The above and other objects of this invention are accomplished by providing an enteric medicament, in which the drug combined therein is protected from the gastric environment by an enteric material, and wherein the improvement comprises employing as said material a partial ester of a copolymer of maleic anhydride which is water soluble at a pH of greater than about 3.5. Such a copolymer comprises repeating structural units in which maleic anhydride and a different monomer are present in a chain; for example, as represented in the following general formula:

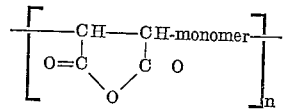

Generally, the "-monomer-" is an alkylene group containing about 2 through 20 carbon atoms and, preferably, between about 2 and 8 carbons. The alkylene monomer can be substituted or unsubstituted. When substituted, the substituents can be, for example, aryl; alkaryl; carbamyl; carbalkoxy (generally containing up to about 5 carbon atoms); lower alkoxy and acyloxy; aryloxy, containing 6 to about 14 carbon atoms; and heterocyclic moieties, containing between about 3 and 7 ring atoms and wherein the hetero atoms can be nitrogen, sulfur, or oxygen. Exemplary of the copolymers of maleic anhydride utilized in this invention are poly-(ethylene-maleic anhydride), poly(vinyl methyl ether-maleic anhydride), poly(diisobutylene-maleic anhydride), poly(allyl acetate-maleic anhydride), poly(propylene-maleic anhydride), poly(butylene-maleic anhydride), poly(vinylpyrrolidone-maleic anhydride), poly-(acrylamide-maleic anhydride), poly(methyl acrylate-maleic anhydride). These copolymers of maleic anhydride can simply and economically be converted to the enteric materials of this invention by esterification so as to produce a partial ester of a copolymer of maleic anhydride. Any ester of a copolymer of maleic anhydride which is water soluble within a pH range of 3.5 to about 8 can be employed. In most cases the ester moiety contains between about 2 and 7 carbon atoms. It is preferred that the ester moiety contains 3 to 4 carbon atoms, since superlative enteric properties are exhibited by such esters.

In one of its aspects this invention relates to an enteric medicament which comprises a drug protected by a partial ester of an alkylene-maleic anhydride copolymer or a partial ester of a copolymer of vinyl methyl ether-maleic anhydride. These latter enteric partial esters generally are: (1) a partial ester of a water soluble vinyl alkyl ether-maleic anhydride copolymer wherein said alkyl group contains between about 1 and 3 carbon atoms and said ester moieties contain between about 2 and 7 carbon atoms; (2) a partial ester of a water soluble alkylene-maleic anhydride copolymer wherein said alkylene group contains between about 2 and 4 carbon atoms and said ester moieties contain between about 2 and 7 carbon atoms; or (3) a partial ester of a water soluble, substituted ethylene-maleic anhydride copolymer wherein the substituent groups are cyclic, such as pyrrolidone or benzene, and said ester moieties contain between about 2 and 7 carbon atoms.

The enteric medicaments of this invention can easily be utilized in the formulation of sustained-release preparations. Such preparations comprise a medicament wherein there is present in combination (1) a drug protected from the gastric environment by an enteric partial ester of a copolymer of maleic anhydride, as defined above, and (2) a drug in a form in which it will be released in the stomach. Generally, the sustained-release medicaments of this invention comprise an uncoated drug in admixture with various enteric-coated fractions of the drug—each fraction designed to release the drug at a specific pH. These sustained-release preparations provide an immediate release of the drug, followed by repeated dosages released in various areas of the intestinal tract to produce a sustained-release effect.

In addition to containing a drug and the above-described enteric coatings, the sustained-release medicaments of this invention may also contain solution-rate-extending materials to provide sustained-release products. Examples of such materials are fatty alcohols and fatty acids, waxes, mono-, di-, or triglyceryl fatty acid esters, esters of dicarboxcyclic acids, and the like. Among the drugs which may be advantageously used in sustained-release dosage forms are amphetamine, acetylsalicyclic acid, d-propoxyphene, adrenocorticosteroids, and phenothiazine.

A preferred embodiment of this invention is an enteric-coated medicament wherein the coating comprises a copolymer of an essentially one-half ester of (1) an ethylene-maleic anhydride copolymer or (2) a vinyl methyl ether-maleic anhydride copolymer wherein the ester moieties of said copolymers contain between about 2–7 carbon atoms.

Exemplary of these preferred copolymers are the essentially one-half propyl ester of poly(ethylene-maleic anhydride); the essentially one-half isopropyl ester of poly(ethylene-maleic anhydride); the essentially one-half butyl ester of poly(ethylene-maleic anhydride); the essentially one-half propyl ester of poly(vinyl methyl ether-maleic anhydride); the essentially one-half isopropyl ester of poly(vinyl methyl ether-maleic anhydride); and the essentially one-half butyl ester of poly(vinyl methyl ether-maleic anhydride). These polymers, when applied to a drug so as to form a protective coating thereupon, produce an exceptional and extremely low-cost enteric coating, and, for this reason, are highly preferred enteric materials. Such a series of copolymeric esters has a remarkable property in that each ester in the series becomes water soluble at a specific pH which increases as the length of the ester chain increases.

Examples of this specificity of water solubility with pH are given for some of the essentially one-half esters of poly(ethylene-maleic anhydride) and poly(vinyl methyl ether-maleic anhydride) using polymer-coated tablets:

| Copolymeric Half-ester | pH |
| --- | --- |
| Ethyl ester of ethylene-maleic anhydride | 4.5 |
| n-Propyl ester of ethylene-maleic anhydride | 5.0 |
| n-Butyl ester of ethylene-maleic anhydride | 5.4 |
| n-Propyl ester of vinyl methyl ether-maleic anhydride | 5.6 |
| n-Butyl ester of vinyl methyl ester-maleic anhydride | 6.0 |
| n-Hexyl ester of ethylene-maleic anhydride | 6.4 |
| n-Heptyl ester of ethylene-maleic anhydride | 7.0 |

The term "drug" is used herein in its broadest sense as indicating any substance or composition which will give a pharmacological response. Ammonium chloride, acetylsalicyclic acid, potassium, iodide, para-aminosalicyclic acid, sodium salicylate, ephedrine, barbital, thyroid, pancreatin, theophylline, sex hormones, hydantoins, trimethadione, ferrous sulfate, potassium thiocyanate, and related drugs are representative of the class of drugs which may be administered in the form of the enteric medicaments of this invention.

It can thus be seen that the enteric materials of this invention are basically copolymeric substances which, unexpectedly, exhibit excellent enteric properties upon the formation of esters (or alkali metal and amine salts of these esters) containing a specific number of carbon atoms in the ester moiety. The above-described esters and their salts are stable in the environment of the stomach and disintegrate in the intestinal tract—even in those parts of the intestinal tract which are slightly acidic—so as to release the drug for absorption. The area of the intestinal tract at which disintegration of the enteric material takes place is controlled primarily by the number of carbon atoms in the ester moiety of the copolymer ester. For example, if optimum absorption of a medicament occurs in the duodenum, one can select as the enteric material the half n-propyl ester of poly(vinyl methyl ether-maleic anhydride) having a molecular weight of about 15,000. Likewise, enteric materials allowing absorption of the drug in the jejunum, or any other intestinal locus, can be prescribed.

The enteric materials of this invention (e. g., esterified copolymers of ethylene-maleic anhydride and vinyl methyl ether-maleic anhydride) can be used to protect the drug in a variety of different procedures as, for example, (1) liquid coating procedures, such as spray coating, pan coating, and the like; (2) dry coating techniques, such as press-coating of tablets; and (3) drug-enteric copolymer (i. e., the enteric materials of this invention) mixtures, such as homogeneous admixtures, or the chemical reaction products of a drug with the enteric materials of this invention. In the case of homogeneous admixtures the medicament may be intimately mixed with the enteric material as a dry powder, solution, suspension, or melt. The liquid mixtures are dried and ground before use. The dry drug-enteric material mixtures are then used in the preparation of tablets, pellets, granules, powders, and the like dosage forms.

Thus, this invention provides enteric materials which can simply and economically be modified to produce a wide variety of enteric medicaments. This modification can essentially be effected in the pharmaceutical manufacturer's facilities and can be "tailored" to specific pharmaceutical applications. By selecting esters or salts thereof from the above-described ranges, it is now possible to economically and conveniently control such heretofore difficultly controlled variables as, (1) disintegration time, (2) disintegration locus, and (3) rate of disintegration, (e. g., rapid or a sustained release—all in a simple and highly advantageous fashion. Also, the enteric coatings of this invention have the advantage of not being brittle. This property obviates many existing problems in the manufacture of enteric medicaments which result from brittleness of enteric coatings.

The following examples more fully demonstrate the preparation of the enteric materials of this invention (i.e., the partial esters of maleic anhydride copolymers), and the application of these enteric materials to protectively coat a drug and thus form the enteric medicaments of this invention. Examples I through VII demonstrate the preparation of a wide variety of esters of copolymeric ethylene-maleic anhydride and copolymeric vinyl methyl ether-maleic anhydride, as well as the application of the resulting esters to various drugs by spray-coating techniques.

EXAMPLE I

To a reaction vessel provided with means for heating, stirring, and refluxing were added 70 parts of linear copoymeric ethylene-maleic anhydride, having a specific viscosity of 0.6 (1 percent concentration in dimethylformamide at 25° C.) and a molecular weight of 25,000. To this material were added 280 parts of n-butanol and the resultant mixture was slurried. Heat was applied under reflux conditions for two hours to produce a clear, viscous, bright-yellow solution. This solution was placed in an evaporating dish and heated at 65° C. for eight hours at four mm. (Hg). The odorless, hard, cohesive mass, the half n-butyl ester of poly(ethylene-maleic anhydride), was dissolved in sufficient acetone to prepare a 10 percent (weight/weight) solution.

A 5 percent (weight/volume) acetone solution of the above-prepared half n-butyl ester of poly(ethylene-maleic anhydride) was placed into a spray gun and diethyl phthalate (four parts copolymeric ester to one part diethyl phthalate) was added as an aid to spraying. The spray gun was adjusted to deliver a fine spray which was applied to 0.5 g. placebo tablets rotating in a conventional pharmaceutical coating pan. The spray mixture was applied to the tablets to a final concentration of 10 mg. per tablet. A small amount of inert dusting powder (15 percent magnesium stearate and 85 percent talc) was applied during the spraying in order to minimize tackiness and to facilitate tumbling of the tablets during rotation of the pharmaceutical coating pan.

The tablets coated with the half n-butyl ester of poly(ethylene-maleic anhydride) by the above-described method were then submitted to the Tablet Distintegration Test for enteric-coated tablets described in the United States Pharmacopoeia, XVI, on page 935. This test conclusively demonstrated that a protective coating of the half n-butyl ester of poly(ethylene-maleic anhydride) is an excellent enteric material.

In the above example, excellent enteric coatings were also produced when final concentrations of the half-butyl ester of poly(ethylene-maleic anhydride) were approximately 7.0 mg. per tablet to greater than 30 mg. per tablet. Preferred concentrations were demonstrated to be in the range of about 10–15 mg. per tablet.

Similar results were obtained when the above example was repeated using 5 grain potassium iodide tablets and 3 grain quinidine sulfate tablets.

EXAMPLE II

The half n-butyl ester of poly(vinyl methyl ether-maleic anhydride) was synthesized according to the procedure of Example I using 80 parts of linear poly(vinyl methyl ether-maleic anhydride) having a specific viscosity of 2.6–3.5 (1 percent solution in methyl ethyl ketone at 25° C.) and a molecular weight of 25,000–30,000. This material was reacted with 300 parts of n-butanol for about four hours to produce a viscous, slightly yellow, clear solution. The solution was dried in vacuo (10 mm. Hg) at 150° F. for 18 hours. The dry, hard residue comprising the half n-butyl ester of poly(vinyl methyl ether-maleic anhydride) was ground to about a 20 mesh size (A.S.T.M.) and then dissolved in acetone as a one percent (weight/volume) solution.

Tablet coating was effected using a procedure similar to that described in Example I except that a one percent ester-acetone solution was employed. The final concentration of the ester coating was 5.0 mg. per tablet. The excellent enteric properties of the resultant coatings were clearly demonstrated by the Tablet Disintegration Test employed in Example I.

In the above example coating concentrations of the half n-butyl ester of poly(vinyle methyl ether-maleic anhydride) ranged from approximately 5.0 mg. per tablet to greater than 20 mg. per tablet. The preferred concentration was demonstrated to be about 15 mg. per tablet.

EXAMPLE III

The half n-hexyl ester of poly(ethylene-maleic anhydride) was synthesized according to the method of Example I using 80 parts of a linear copolymer of ethylene-maleic anhydride and 320 parts of n-hexanol. The resulting clear, yellow solution was evaporated to dryness by heating to 150° F. for 48 hours at 10 mm. (Hg), followed by a heating at 170° F. for a period of 48 hours at 10 mm. (Hg). The amber, vitreous residue was slightly softer than the half n-butyl ester of poly(ethylene-maleic anhydride) produced in Example I.

Spray coating of 0.5 gm. placebo tablets, utilizing a two percent (weight/volume) acetone solution of the above-produced half n-hexyl ester of poly(ethylene-maleic anhydride) was accomplished according to the method used in Example I. The excellent enteric properties of the resultant coats were affirmed by the Tablet Disintegration Test described in Example I. In the above preparation coating concentrations ranged upward from about 10 mg. of coating per tablet, with the preferred concentration being about 14 mg. per tablet.

EXAMPLE IV

The half n-propyl ester of poly(ethylene-maleic anhydride) was prepared according to the procedure described in Example I, except that 20 parts of poly(ethylene-maleic anhydride) were refluxed for two and one-half hours with 80 parts n-propanol. After drying, 15 parts of the white, hard residue (the half n-propyl ester of poly(ethylene-maleic anhydride)) were dissolved in 100 parts of acetone. This mixture was then diluted with acetone to a 2 percent (weight/volume) mixture of the ester for spray coating onto 7.5 grain ammonium chloride tables, according to the procedure described in Example I. These tablets, when submitted to the Tablet Disintegration Test set forth in Example I, were clearly shown to posses excellent enteric properties.

EXAMPLE V

To an open reaction vessel, provided with means for heating and stirring, were added 300 parts of linear poly(ethylene-maleic anhydride), having a specific viscosity of 0.6 (1 percent solution in dimethylformamide at 25° C.) and a molecular weight of 25,000. Thereafter, 1050 parts of n-heptanol were added to the reaction vessel and the mixture was slurred by stirring. Heating and agitation were continued until the mixture became "pastelike" with fuming at about 85° C. At 92° C. the mixture became more fluid, and at 134° C. a clear, light-yellow solution was formed. The total heating time was 3 hours. Drying at 140° F. for 67 hours at 10 mm. (Hg) produced a hard, amber residue which was slightly adhesive at room temperature. This material was identified as the half n-heptyl ester of poly(ethylene-maleic anhydride).

A 5 percent (weight/weight) acetone solution of the above-produced half n-heptyl ester was placed in a spray gun and cetyl alcohol (4 parts of the copolymeric ester, 1 part cetyl alcohol) was then added. The coating procedure was similar to that employed in Example I with the exception that placebo sugar pellets (10–20 mesh, A.S.T.M.) were used in lieu of tablets. The coating was applied to a final concentration of 2.5–5.0 g. per 100 g. of pellets.

The excellent enteric properties of the resultant coated pellets were demonstrated by submitting the pellets to the Tablet Disintegration Test described in Example I. In the above example, concentrations of the coating mixture of 2.5 to 5.0 g. per 100 g. of pellets produced preferred enteric coatings.

EXAMPLE VI

The half isopropyl ester of poly(ethylene-maleic anhydride) was prepared according to the procedure described in Example I, using 15 g. of linear copolymeric ethylene-maleic anhydride and 80 ml. of isopropyl alcohol. The mixture was heated under reflux conditions for three hours. The light-yellow, viscous material was dried to a light-yellow, hard mass which was identified as the half isopropyl ester of poly(ethylene-maleic anhydride).

Seven and one-half grain ammonium chloride tablets were coated according to the procedure described in Example I using a 2 percent (weight/volume) acetone solution of the half isopropyl ester prepared above. The enteric properties of the resultant coatings were clearly demonstrated using the Tablet Disintegration Test described in Example I.

EXAMPLE VII

Following the procedure of Example I, the half n-heptyl ester of poly(vinyl methyl ether-maleic anhydride) was prepared using 15 parts of linear copolymeric vinyl methyl ether-maleic anhydride—having a specific viscosity range from 2.5 to 3.5 (1 percent solution in methyl ethyl ketone at 25° C.), a molecular weight ranging from 25,000 to 30,000—and 60 parts of n-heptanol in place of the poly(ethylene-maleic anhydride) and n-butanol. The viscous, clear, yellow solution was dried to a yellow, hard mass which was sized to pass a No. 10 screen (A.S.T.M.). This material was the half n-heptyl ester of poly(vinyl methyl ether-maleic anhydride).

Placebo sugar pellets (10–20 mesh, A.S.T.M.) were coated according to the procedure of Example I, utilizing a 4 percent (weight/volume) acetone solution, containing 4 parts of the above-prepared half n-heptyl ester of poly(vinyl methyl ether-maleic anhydride) and 1 part of diethyl phthalate. The excellent enteric properties of the resultant pellets were demonstrated by the Tablet Disintegration Test set forth in Example I. It was found that a concentration of about 2.4 g. of the half n-heptyl ester per 100 g. of sugar pellets provided pellets with preferred enteric properties. However, lesser and greater concentrations satisfactorily passed the United States Pharmacopoeia test for tablet disintegration.

Examples VIII–XIII demonstrate the preparation of essentially half esters of poly(ethylene-maleic anhydride) and poly(vinyl methyl ether-maleic anhydride) wherein the ester moieties of the respective copolymers contain two through six carbon atoms. The application of the resultant enteric materials to produce enteric medicaments by pan coating techniques is also demonstrated.

EXAMPLE VIII

The half n-butyl ester of poly(ethylene-maleic anhydride) was prepared following the procedure of Example I, with the exception that 20 parts of linear copolymeric ethylene-maleic anhydride and 80 parts of n-butanol were reacted in place of the amounts used in Example I. Fifteen grams of the half n-butyl ester of poly(ethylene-maleic anhydride) were then dissolved in 100 ml. of acetone. This solution was applied to 7.5 grain ammonium chloride tablets in successive 5 ml. applications as the tablets were tumbled in a typical rotating coating pan. Occasional light dusting with an inert powder (15 percent magnesium stearate and 85 percent talc) minimized tackiness. The enteric properties of the coated tablets were clearly demonstrated by submitting them to the Tablet Disintegration Test described in Example I.

EXAMPLE IX

Twenty parts of linear copolymeric ethylene-maleic anhydride and 60 parts of n-hexanol were reacted according to the procedure described in Example I. Fifteen parts of the dried product, the half n-hexyl ester of poly (ethylene-maleic anhydride), were dissolved in 100 parts of acetone. This mixture was then used to coat seven and one-half grain ammonium chloride tablets, employing the procedure described in Example VIII. The excellent enteric properties of these tablets were clearly demonstrated using the test method described in Example I.

EXAMPLE X

The half ethyl ester of poly(ethylene-maleic anhydride) was prepared according to the procedure set forth in Example I using 42 parts of linear copolymeric ethylene-maleic anhydride and 120 parts of Specially Denatured Alcohol, 2B Absolute. The resultant clear solution of the half ethyl ester of poly(ethylene-maleic anhydride) was dried in vacuo.

Seven and one-half grain ammonium chloride tablets were then pan coated with a 15 percent (weight/volume) acetone solution of the half ethyl ester of poly(ethylene-maleic anhydride) as in Example VIII. These coatings had excellent enteric properties as was demonstrated by the Tablet Disintegration Test described in Example I.

EXAMPLE XI

The half n-butyl ester of poly(vinyl methyl ether-maleic anhydride) was prepared by reacting 10 parts of linear poly(vinyl methyl ether-maleic anhydride) (specific viscosity 0.1–0.5, 1 percent solution in methyl ethyl ketone at 25° C., molecular weight 5,000) and 40 parts of n-butanol. This mixture was refluxed for a period of three and one-half hours. The resultant solution was dried to produce a hard, nontacky, light-yellow material which was identified as the half n-butyl ester of poly(vinyl methyl ether-maleic anhydride). This material was dissolved in acetone to give a 10 percent (weight/volume) solution, which was then applied to 7.5 grain ammonium chloride tablets by the procedure described in Example VIII. These tablets, coated with the half n-butyl ester, exhibited excellent enteric properties, when tested by the method described in Example I.

EXAMPLE XII

Following the procedure in Example I, the half n-propyl ester of poly(vinyl methyl ether-maleic anhydride) was prepared using 250 parts of n-propanol and 50 parts of linear poly(vinyl methyl ether-maleic anhydride), having a specific viscosity of 1.0–1.6 (1 percent solution in methyl ethyl ketone at 25° C.) and a molecular weight of 15,000. The ester thus produced was a clear, viscous solution which was evaporated to dryness on a steam bath and then dried at 60° C. for ten hours at four mm. (Hg). Seven and one-half grain ammonium chloride tablets were coated with the half n-propyl ester of poly (vinyl methyl ether-maleic anhydride) using 5 percent (weight/volume) solution in acetone and employing the procedure of Example VIII. The enteric properties of the resultant coated tablets were clearly established by the Tablet Disintegration Test set forth in Example I.

EXAMPLE XIII

The procedure of Example I was employed in preparing the half ethyl ester of poly(vinyl methyl ether-maleic anhydride) with the exception that 300 parts of Specially Denatured Alcohol, 3A, and 50 parts of linear poly(vinyl methyl ether-maleic anhydride), specific viscosity 1.0–1.6 (1 percent solution in methyl ethyl ketone at 25° C.) and a molecular weight of 15,000 were used. The resultant clear solution was evaporated to dryness on a steam bath and then dried at 60° C. for four hours at 4 mm. (Hg) to produce a hard, nontacky mass, the half ethyl ester of poly(vinyl methyl ether-maleic anhydride).

This product was then coated from a 5 percent (weight/volume) solution in acetone onto seven and one-half grain ammonium chloride tablets utilizing the procedure of Example VIII. Enteric properties of the resultant coated tablets were established by the Tablet Disintegration Test procedure set forth in Example I.

Example XIV and XV demonstrates the technique of producing the enteric medicaments of this invention by compression coating. Furthermore, Example XV demonstrates the preparation of a salt of a partially esterified maleic anhydride copolymer.

EXAMPLE XIV

The procedure of Example V for the preparation of the half n-heptyl ester of poly(ethylene-maleic anhydride) was employed with the exception that 525 parts of linear poly(ethylenemaleic anhydride) and 2,000 parts of n-butanol were utilized. This mixture was heated at boiling temperature until it became a clear, light-yellow, viscous solution. The solution was then dried and the residue was the half n-butyl ester of poly(ethylene-maleic anhydride).

Fifteen parts of the half n-butyl ester were then dissolved and intimately mixed with 42 parts of dry calcium carbonate and 42 parts of dry lactose using an eccentric stirrer. This uniform mixture was then granulated with a solution containing 80 parts of acetone and 20 parts of water. The wetted mixture was then passed through a No. 6 mesh screen (A.S.T.M.). The resultant granulation was spread thinly on trays and dried for 24 hours at a relative humidity of 25 percent at 25° C. The dried granulation was then passed through a No. 30 mesh screen and intimately mixed with one part magnesium stearate. The resultant mixture was placed in the feed hopper of a Kilian press coating machine and was press-coated over 5 grain ammonium chloride tablet cores. The enteric properties of these coatings were demonstrated according to the Tablet Disintegration Test set forth in Example I.

EXAMPLE XV

Following the procedure of Example V, 126 g. of linear poly(ethylene-maleic anhydride) (specific viscosity 0.6 as 1 percent solution in dimethylformamide at 25° C., molecular weight of 25,000) was heated at boiling with 500 ml. of n-butanol to form a clear, viscous, light-yellow solution. At 70° C., 500 ml. of methanol were added and mixed well. Sodium hydroxide, 40 g. dissolved in 300 ml. of methanol, was added with vigorous stirring. This yellow solution was then poured into one liter of isopropanol, and the mixture was heated on a steam bath to remove most of the methanol (heating was discontinued at 75° C.). The nonfilterable material was strained through a 100 mesh screen (A.S.T.M.), and the residue was dried on a steam bath with the aid of a heating lamp. The slightly gray material, the sodium salt of the half n-butyl ester of poly(ethylene-maleic anhydride), was ground to a fine powder.

Fifteen parts of the above sodium salt were mixed intimately with 54 percent calcium sulfate, 27 percent lactose and 3 percent sodium carboxymethylcellulose (viscosity of 2 percent aqueous solution 25 to 50 cps. at 25° C.). These constituents were then granulated with a mixture of 90 percent Specially Denatured Alcohol, 3A, and 10 percent water. The wetted mixture was then passed through a No. 6 mesh screen (A.S.T.M.). The resultant granulation was spread thinly on trays, and dried for 24 hours at a relative humidity of 25 percent at 25° C. The dried granulation was then passed through a No. 30 mesh screen (A.S.T.M.) and intimately mixed with one part magnesium stearate. The resultant mixture was placed in the feed hopper of a Kilian press-coating machine and was press-coated over 5 grain ammonium chloride tablet cores. The enteric properties of these coatings were demonstrated according to the Tablet Disintegration Test set forth in Example I.

The term "partial ester" as utilized herein refers to the degree of esterification of a copolymer of maleic anhydride utilized as the enteric materials of this invention. By "degree of esterification" is meant the percent conversion of the anhydride function of the copolymer of maleic anhydride to the corresponding ester. For example, the essentially half ester of a copolymeric ester of maleic anhydride indicates approximately 50 percent conversion of the anhydride function to esters—a partial ester since the degree of esterification is less than 100 percent. Although it is preferred to employ approximately a 50 percent degree of esterification, because of the excellent results and favorable economics obtained therewith, it is not to be inferred that the copolymers employed in this invention need be so limited, as any degree of esterification which will render the copolymer water insoluble at a pH of less than 3.5, but water soluble at a pH range of 3.5 to about 8, can be employed. Thus, in general, the copolymeric ester employer in this invention will be soluble within the above-specified range when the degree of esterification therein falls within the range of about 10–80 percent. When the ester moiety contains 2 to 7 carbon atoms, however, it is preferred that the degree of esterification range from about 50 to about 70 percent.

Examples of the relationship between degree of esterification and total number of carbon atoms in the ester moiety to produce partial esters soluble in water at a pH greater than about 3.5 are shown for poly(ethylene-maleic anhydride) and poly(vinyl methyl ether-maleic anhydride) in the following table:

Table I

| Carbon Atoms in Ester Moiety | Degree of Esterification (Percent) | |
|---|---|---|
| | Minimum | Maximum |
| 2 | 45 | 80 |
| 3 | 40 | 75 |
| 4 | 35 | 70 |
| 5 | 30 | 65 |
| 6 | 25 | 60 |
| 7 | 20 | 55 |
| 8 | 10 | 25 |

In Examples XVI and XVII the importance of the relationship between the degree of esterification and the number of carbon atoms in the ester moieties of the copolymeric ester of maleic anhydride is demonstrated. In Example XVI the one-third butyl ester of poly(ethylene-maleic anhydride) is produced, and this material is applied to a drug by a spray coating technique. In Example XVII the one-fifth octyl ester of poly(ethylene-maleic anhydride) is prepared, and this material is applied to a drug using pan coating techniques. In each case, it can be seen that the relationship between the degree of esterification and the number of carbon atoms in the ester moiety is within the range for enteric properties shown in Table I.

EXAMPLE XVI

To a reaction vessel provided with means for heating, stirring, and refluxing were added 20 grams of linear poly(ethylene-maleic anhydride) having a specific viscosity of 0.6 (1 percent solution in dimethylformamide at 25° C.) and a molecular weight of 25,000. To this material were added 12.6 g. of n-butanol and 100 ml. of methyl isobutyl ketone, and the mixture was slurried. This mixture was heated under reflux conditions for four hours to form a hazy, light-yellow, slightly viscous solution. Twenty milliliters of acetone were added to produce a clear solution. This mixture contained about 18 percent, by weight, of the n-butyl ester of poly(ethylene-maleic anhydride). This product was 75 percent esterified to the half ester (about one-third total esterification).

Seven and one-half grain ammonium chloride tablets were coated with the above one-third ester from a 10 percent (weight/volume) acetone solution using the procedure described in Example I. The enteric properties of the resultant coated tablets were clearly demonstrated using the Tablet Disintegration Test described in Example I.

EXAMPLE XVII

The partial n-octyl ester of poly(ethylene-maleic anhydride) was prepared according to the method described in Example XVI using 10 g. of linear poly(ethylene-maleic anhydride), 8.7 g. of n-octanol and 100 ml. of acetone. The slightly cloudy mixture was analyzed and found to be 40 percent esterified to the half ester (about one-fifth total esterification).

Seven and one-half grain ammonium chloride tablets were coated with the above partial ester by the procedure set forth in Example VIII. The enteric properties of the coated tablets were clearly demonstrated using the Tablet Disintegration Test described in Example I.

In all the above examples a single compound of the copolymeric ester of maleic anhydride was used. However, it is also possible to employ mixtures of the partial esters of maleic anhydride copolymers. The following examples demonstrate the enteric properties of such mixtures.

EXAMPLE XVIII

The half ethyl ester of poly(ethylene-maleic anhydride), prepared in Example X, was mixed in equal parts with the half butyl ester of poly(ethylene-maleic anhydride), prepared as in Example I, to make a 10 percent (weight/volume) solution in acetone. This solution was cast on an inert support and dried thereon to about 0.020 inch thickness. The excellent enteric properties of the protective coating thus produced were demonstrated by submitting the film to the Tablet Disintegration Test described in Example I and observing its solubility.

EXAMPLE XIX

A mixture of equal parts of the half n-octyl ester of poly(ethylene-maleic anhydride) and the half n-butyl ester of poly(ethylene-maleic anhydride) was prepared and dissolved in acetone to make a 10 percent (weight/volume) solution. Films were cast on inert supports, as described in Example XVIII. The enteric properties of these films were demonstrated using the Tablet Disintegration Test of Example I and noting its solubility.

The molecular weights of the anhydride form of the copolymers employed in this invention range from about 1,200 to about 100,000. In general, it is preferred to employ a poly(ethylene-maleic anhydride) having a molecular weight of about 25,000 and a poly(vinyl methyl ether-maleic anhydride) having molecular weights between 15,000 and 25,000-30,000.

Among the medicaments which may be advantageously enteric coated by this invention are the following: sodium salicylate, acetylsalicylic acid, ammonium chloride, theophylline with sodium acetate, thyroid, erythromycin, sodium chloride, potassium thiocyanate, potassium chloride, secobarbital, potassium nitrate, ferrous sulfate, methenamine-sodium biphosphate, para-aminosalicylic acid, mandelic acid-ammonium chloride, emetine combined with bismuth compounds, diethylstilbestrol, aminophyllin, theobromine, sodium acetate, pancreatin, bile salts, extract of bile, dithiazanine, gentian violet, anthelmintics, trypsin, salts of mercury, sodium ricinoleate, and the like.

In vivo clinical evaluation of the enteric medicaments of this invention fully demonstrated the excellent enteric properties thereof above and beyond the excellent in vitro results achieved by submission of the enteric materials to the United States Pharmacopoeia Tablet Disintegration Test described more fully in Example I.

The in vitro evaluation involved coating 5 grain acetylsalicylic acid tablets with the partial esters of maleic anhydride copolymers which are employed in preparing the enteric medicaments of this invention. For example, the half n-butyl ester of poly(ethylene-maleic anhydride), produced according to the procedure set forth in Example I, and the half n-propyl ester of poly(vinyl methyl ether-maleic anhydride), produced by the method of Example XII, were coated onto the above tablets using the coating techniques described previously. The coatings were applied to the tablets in such a way as to achieve various release or disintegration times at specific pH values. In other words, the enteric medicaments were "tailor-made" to meet a specific enteric design problem. The purpose of employing acetylsalicylic acid was as a "tracer" to measure absorption in the blood and excretion in the urine.

The in vivo evaluation compared these coated tablets to uncoated 5 grain acetylsalicylic acid control tablets in human subjects. Absorption of acetylsalicylic acid in the blood and its excretion in the urine were measured by conventional analytical procedures. The blood levels from both coated tablets indicated a two-hour induction period during which no detectable blood levels were observed, while the uncoated control tablets gave almost immediate blood levels. The induction periods from the urinary excretion data also support the blood level data. This indicates that the enteric coatings have protected the drug from absorption in the stomach. Furthermore, it was found that absorption peaks and urinary excretion rate peaks with the coated tablets occurred at later times than the control and in order of pH-solubility rate of the coating. Cumulative urinary excretion data indicated complete physiological availability from both coated tablets when compared to the control.

The degree of absorption of the acetylsalicylic acid in the blood and the rate of excretion in the urine substantially correspond and correlate well with in vitro results. These data clearly establish that the partial esters of maleic anhydride copolymers of this invention are excellent enteric materials.

We claim:

1. An enteric medicament which comprises a drug protected from the gastric environment by a coating of a partial ester of a copolymer selected from the group consisting of the poly(olefin-maleic anhydride)s wherein the olefin moiety contains from 2 to 20 carbon atoms and the poly(vinyl alkyl ether-maleic anhydride)s wherein the alkyl group contains from 1 to 3 carbon atoms, said partial ester being water soluble at a pH greater than about 3.5.

2. The composition of claim 1 wherein the degree of esterification in said partial ester is between about 10 and 80 percent.

3. The composition of claim 1 wherein said partial ester is in the form of an alkali metal salt thereof.

4. An enteric medicament which comprises a drug protected by a partial ester of poly(ethylene-maleic anhydride) wherein the ester moiety contains between about 2 and 7 carbon atoms.

5. An enteric-coated medicament wherein the coating comprises an essentially one-half ester of poly(ethylene-maleic anhydride) in which the ester moiety contains between about 2-7 carbon atoms.

6. An enteric medicament which comprises a drug protected from the gastric environment by an essentially half butyl ester of poly(ethylene-maleic anhydride).

7. An enteric medicament which comprises a drug protected from the gastric environment by an essentially half propyl ester of poly(ethylene-maleic anhydride).

8. An enteric medicament which comprises a drug protected by a partial ester of poly(vinyl alkyl ether-maleic anhydride) wherein the ester moiety contains between about 2 and 7 carbon atoms, and said alkyl group contains between about 1 and 3 carbon atoms.

9. An enteric medicament which comprises a drug protected from the gastric environment by an essentially half butyl ester of poly(vinyl methyl ether-maleic anhydride).

10. An enteric medicament which comprises a drug protected from the gastric environment by an essentially half propyl ester of poly(vinyl methyl ether-maleic anhydride).

11. A sustained-release preparation which comprises (1) a drug and (2) a drug protected from the gastric environment by an enteric partial ester of a copolymer of maleic anhydride.

References Cited in the file of this patent

UNITED STATES PATENTS

| | | |
|---|---|---|
| 2,066,105 | Hagedorn et al. | Dec. 29, 1936 |
| 2,702,264 | Klaui | Feb. 15, 1955 |
| 2,897,121 | Wagner | July 28, 1959 |
| 2,897,122 | Millar | July 28, 1959 |
| 2,954,323 | Endicott et al. | Sept. 27, 1960 |
| 2,957,804 | Schuyler | Oct. 25, 1960 |
| 2,993,837 | Millar | July 25, 1961 |
| 3,070,509 | Volker et al. | Dec. 25, 1962 |
| 3,081,233 | Enz et al. | Mar. 12, 1963 |

FOREIGN PATENTS

| | | |
|---|---|---|
| 109,438 | Australia | Jan. 11, 1940 |

OTHER REFERENCES

Micciche: "La Preparazione di Medicamenti per Uso Orale a Cessione Ritardata Prestabilita (Oral Medicinal Preparation with Fixed Retardation of Release), Bolletino (Other references on following page)

Chimico Farmaceutico, Milan, vol. 94, pp. 485–493 (1955), in Italian.

Martin et al.: "Remington's Practice of Pharmacy," 11th Ed., pp. 400–419, published 1956, Mack Publishing Co., Easton, Pa.

Jenkins et al.: Scoville's The Art of Compounding, 9th Ed., pp. 75–79, 86–89, 91–92, 105–108, published 1957, McGraw-Hill Book Co., New York, N.Y.

Chapman et al.: "Physiological Availability of Drugs in Tablets," Canad. Med. Ass'n J., vol. 76, pp. 102–106, January 15, 1957.

Dragstedt: "Oral Medication with Preparations for Prolonged Action," J.A.M.A., vol. 168, No. 12, pp. 1652–1655, November 22, 1958.

Lazarus et al.: "Oral Prolonged Action Medicaments: Their Pharmaceutical Control and Therapeutic Aspects," J. Pharm. and Pharmacol., vol. 11, No. 5, pp. 257–290 (pp. 266–271, 277–279, and 285–288 are especially pertinent to In Vivo Tablet Availability of Drugs), May 1959.

Campbell et al.: Oral Prolonged Action Medication, Practitioner, vol. 183, pp. 758–765, December 1959.

Gross et al.: "Transformulation to Filmcoating," Drug and Cosmetic Industry, vol. 86, No. 2, pp. 170–171, 264, 288–291, February 1960.

Lazarus et al.: "Absorption, Testing, and Clinical Evaluation of Oral Prolonged-Action Drugs-Review Article," Journal of Pharmaceutical Sciences, vol. 50, No. 9, pp. 715–731, September 1961.

UNITED STATES PATENT OFFICE
CERTIFICATE OF CORRECTION

Patent No. 3,143,472                                    August 4, 1964

Lewis C. Lappas et al.

It is hereby certified that error appears in the above numbered patent requiring correction and that the said Letters Patent should read as corrected below.

Column 1, line 44, for "As" read -- An --; column 2, line 12, for "waer" read -- water --; same column, lines 17 to 21, the formula should appear as shown below instead of as in the patent:

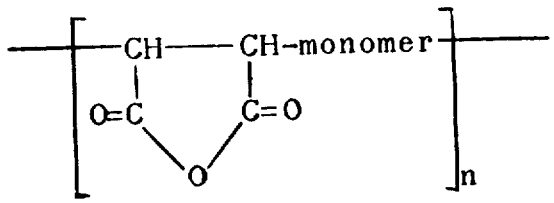

column 3, in the table, line 5 thereof, for "methyl ester" read -- methyl ether --; line 63, for "potassium, iodide," read -- potassium iodide, --; column 4, line 42, for "release" read -- release) --; column 5, line 53, for "vinyle" read -- vinyl --; column 8, line 27, for "using 5" read -- using a 5 --; column 9, line 12, for "1 percent" read -- a 1 percent --; line 54, for "esters" read -- ester --; line 64, for "employer" read -- employed --; column 14, after line 17, insert the following reference:

Martin et al. "HUSA'S Pharmaceutical Dispensing, 5th Ed., pp. 93-100, 577-590, published 1959, Mack Publishing Co., Easton, Pa.

Signed and sealed this 5th day of January 1965.

(SEAL)
Attest:

ERNEST W. SWIDER
Attesting Officer

EDWARD J. BRENNER
Commissioner of Patents